United States Patent
Ma

(10) Patent No.: US 10,778,790 B2
(45) Date of Patent: Sep. 15, 2020

(54) INFORMATION NOTIFICATION METHOD, ELECTRONIC DEVICE, AND NETWORK APPARATUS

(71) Applicant: Lenovo (Beijing) Co., Ltd., Beijing (CN)

(72) Inventor: Binqiang Ma, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 10 days.

(21) Appl. No.: 15/920,909

(22) Filed: Mar. 14, 2018

(65) Prior Publication Data

US 2019/0104187 A1   Apr. 4, 2019

(30) Foreign Application Priority Data

Sep. 29, 2017   (CN) .......................... 2017 1 0910054

(51) Int. Cl.
    *H04L 29/08*   (2006.01)
    *H04M 1/725*   (2006.01)

(52) U.S. Cl.
    CPC .............. *H04L 67/22* (2013.01); *H04L 67/10* (2013.01); *H04L 67/18* (2013.01); *H04L 67/24* (2013.01)

(58) Field of Classification Search
    CPC ......... H04L 67/10; H04L 67/18; H04L 67/22; H04L 67/24; H04L 67/26; H04L 12/1859; G06Q 30/02; H04W 4/12
    See application file for complete search history.

(56) References Cited

U.S. PATENT DOCUMENTS

| | | | | |
|---|---|---|---|---|
| 8,176,176 B1* | 5/2012 | Chan | ..................... | H04L 67/22 455/405 |
| 8,275,402 B2* | 9/2012 | Talty | ..................... | H04L 12/189 455/518 |
| 8,825,842 B2* | 9/2014 | Papakipos | ............. | G06Q 10/10 709/224 |
| 2006/0178932 A1* | 8/2006 | Lang | ..................... | G06Q 30/02 705/14.73 |
| 2010/0325194 A1* | 12/2010 | Williamson | ............ | H04L 67/18 709/203 |
| 2012/0278475 A1* | 11/2012 | Papakipos | ............. | G06Q 10/10 709/224 |
| 2013/0336311 A1* | 12/2013 | Laasik | .................. | H04M 7/006 370/352 |
| 2014/0189015 A1* | 7/2014 | Chan | .................... | G06Q 10/107 709/204 |
| 2015/0181556 A1* | 6/2015 | Dey | .................... | H04W 68/005 455/466 |

(Continued)

FOREIGN PATENT DOCUMENTS

| | | |
|---|---|---|
| CN | 105577955 A | 5/2016 |
| CN | 106210352 A | 12/2016 |
| CN | 106325469 A | 1/2017 |

*Primary Examiner* — Alina A Boutah
(74) *Attorney, Agent, or Firm* — Anova Law Group, PLLC

(57) ABSTRACT

A method includes acquiring information and acquiring a user status of a target user. In response to the user status indicating it is inconvenient for the target user to check the information, execution of a notification command that prompts the target user of acquisition of the information is postponed. In response to the user status indicating it is convenient for the target user to check the information, the notification command is executed.

16 Claims, 3 Drawing Sheets

(56) References Cited

U.S. PATENT DOCUMENTS

| | | | |
|---|---|---|---|
| 2015/0319223 A1* | 11/2015 | Deepak Narayana | H04L 67/10 709/206 |
| 2016/0173700 A1* | 6/2016 | O'Connor | H04M 15/60 455/405 |
| 2016/0239737 A1* | 8/2016 | Jiang | H04L 67/26 |
| 2016/0286367 A1* | 9/2016 | Mashhadi | H04L 67/26 |
| 2017/0149913 A1* | 5/2017 | Olomskiy | H04L 67/26 |
| 2018/0176885 A1* | 6/2018 | VanBlon | H04L 67/26 |
| 2018/0232757 A1* | 8/2018 | Leffelman | G06Q 30/02 |
| 2018/0285730 A1* | 10/2018 | Zhao | G06N 3/08 |
| 2019/0037039 A1* | 1/2019 | Wu | H04L 67/26 |

\* cited by examiner

INFORMATION NOTIFICATION METHOD, ELECTRONIC DEVICE, AND NETWORK APPARATUS

CROSS-REFERENCES TO RELATED APPLICATION

This application claims priority to Chinese Patent Application No. 201710910054.5, filed on Sep. 29, 2017, the entire contents of which are hereby incorporated by reference.

TECHNICAL FIELD

The present disclosure generally relates to the field of communication technologies and, more particularly, to an information notification method, an electronic device, and a network apparatus.

BACKGROUND

After acquiring new information, a conventional electronic device often notifies the user that new information is received in a manner known as "instant receiving and instant notifying." That is, the electronic device instantly notifies the user of the new information, which often causes notification to pop up at the electronic device under inappropriate scenarios.

BRIEF SUMMARY OF THE DISCLOSURE

In accordance with the disclosure, there is provided a method including acquiring information and acquiring a user status of a target user. In response to the user status indicating it is inconvenient for the target user to check the information, execution of a notification command that prompts the target user of acquisition of the information is postponed. In response to the user status indicating it is convenient for the target user to check the information, the notification command is executed.

Also in accordance with the disclosure, there is provided a method including acquiring information, acquiring a user status of a target user, determining whether execution of a notification command that prompts the user of acquisition of the information needs to be postponed based on the user status, and sending the information and a determination result regarding whether to postpone the execution of the notification command to a specific electronic device associated with the target user.

Also in accordance with the disclosure, there is provided an electronic device including a memory storing a program and a processor executing the program to acquire information and acquire a user status of a target user. In response to the user status indicating it is inconvenient for the target user to check the information, the processor postpones execution of a notification command that prompts the target user of acquisition of the information. In response to the user status indicating it is convenient for the target user to check the information, the processor executes the notification command.

Also in accordance with the disclosure, there is provided a network apparatus including a memory storing a program and a processor executing the program to acquire information, acquire a user status of a target user, determine whether execution of a notification command that prompts the user of acquisition of the information needs to be postponed based on the user status, and send the information and a determination result regarding whether to postpone the execution of the notification command to a specific electronic device associated with the target user.

BRIEF DESCRIPTION OF THE DRAWINGS

In order to more clearly illustrate technical solutions in embodiments of the present disclosure, drawings for describing the embodiments are briefly introduced below. Obviously, the drawings described hereinafter are only some embodiments of the present disclosure, and it is possible for those ordinarily skilled in the art to derive other drawings from such drawings without creative effort.

DETAILED DESCRIPTION

Technical solutions of the present disclosure will be described in more detail with reference to the accompanying drawings of the present disclosure. Obviously, the disclosed embodiments are merely some, but not all, of the embodiments of the present disclosure. Based on the disclosed embodiments, all other embodiments obtainable by those ordinarily skilled in the relevant art without creative labor shall all fall within the scope of the present disclosure.

Figure 1:
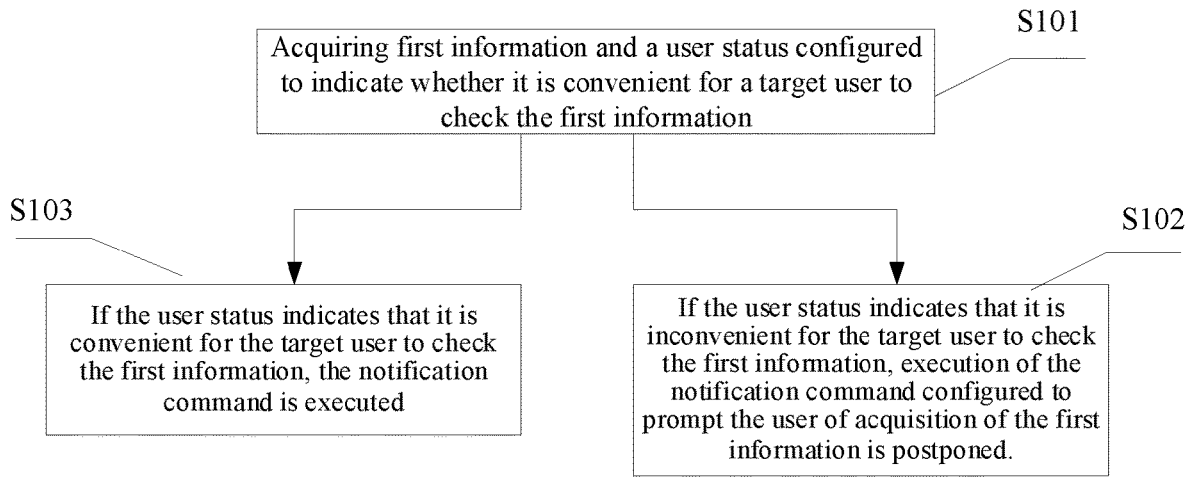
FIG. 1 illustrates a flow chart of an example of an information notification method.

The disclosed information notification method may be applied to an electronic device, where the electronic device may be a terminal device such as a smart phone, a computer, a tablet, or a wearable device. FIG. 1 illustrates a flow chart of an example of an information notification method. As shown in FIG. 1, the method comprises the followings.

At S101, first information is acquired and a user status configured to indicate whether it is convenient for a target user to check the first information is acquired.

In some embodiments, the first information may be generated by the electronic device itself. For example, the electronic device may be used to process a photo took by a user, and after the processing of the photo is completed, the electronic device may generate the first information configured to indicate that processing of the photo is completed.

In some other embodiments, the first information may be sent by a network apparatus to the electronic device. The network apparatus may be a server in the Internet, or a smart router in a home network, or a smart central control device in the home network.

The electronic device may be installed with a communication-type application program, such as a message application program. When another electronic device sends information, such as a text message, to the electronic device, the information may be sent to the network apparatus (e.g., a server in the internet) first and the network apparatus may forward the information to the electronic device.

The electronic device may be installed with a multimedia-type application program, such as a video application program. The network apparatus corresponding to the video application program may send the first information configured to indicate a video update to the video application program. Correspondingly, the electronic device in which the video application program is installed may receive the first information.

The electronic device may be a device owned by the target user, such as a personal cellphone of the target user. The electronic device may also be a device having an association relationship with the target user, for example, the electronic device may be a smart audio system, a smart TV, or a smart fridge that is shared by each family member of the family to which the target user belongs. Further, the electronic device may be a smart projector shared by staff of a company for which the target user works.

To allow those skilled in the relevant art to more clearly understand how to acquire the user status that indicates whether it is convenient for the target user to check the first information, several application scenarios under which it is inconvenient for the user to check the first information will be illustrated hereinafter with reference to specific application scenarios.

In a first-type application scenario, the target user is at a meeting or is communicating with an important client. Under such application scenario, the target user prefers not to be disturbed. In other words, if the electronic device performs notification under this type of application scenario, the target user may be disturbed, and the user experience may be lowered. Thus, based on a schedule of the target user, the user status that indicates whether the target user is at a meeting or is communicating with an important user may be acquired.

In a second-type application scenario, the physiological condition of the target user is considered. The physiological condition of the target user may include: a physical condition, and/or a schedule condition.

The physical condition may include: a health condition, and/or an emotion condition. For example, the health condition of the user may be acquired based on the health report of the target user and/or medical report such as X-ray report that are uploaded to the network apparatus by a health examination application program.

For example, the health condition of the target user may indicate that the target user has heart disease. In this example, if the target user is not focusing on the electronic device, sudden ringing or vibration of the electronic device to prompt notification may trigger the heart disease of the user.

The emotion condition of the target user may be recognized from the heart rate of the target user detected by a smart bracelet worn by the target user, and/or facial expression, and/or voice of the target user.

For example, the emotion condition of the target user may indicate that the target user is relatively happy. In this example, if the electronic device of the target user receives payment information of his credit card for a transaction authorized by his girlfriend without prior notice to the target user, the target user may not become angry finding his credit card to be unexpectedly charged because he is relatively happy. That is, the emotion condition of being happy may indicate that it is a good time or it is convenient for the user to check the first information, while the emotion condition of being unhappy may indicate that it is inconvenient for the user to check the first information.

The schedule condition may include whether the target user is in a sleep condition or an awake condition. In some embodiments, the target user may wear a smart bracelet, and based on the smart bracelet, the schedule condition of the target user may be acquired. If the user status indicates that the target user is in the sleep condition, it is indicated that it is inconvenient for the target user to receive the first information.

In a third-type application scenario, the geological location of the target user may indicate that the surrounding environment of the target user is relatively noisy, such that it is inconvenient for the target user to check the first information.

For example, the geological location of the target user may indicate that the target user is in a public place such as a Karaok (KTV) room. In this example, the target user will probably not notice any notification from the electronic device because the environment is relatively noisy. Under such situation, it is inconvenient for the user to check the first information.

As another example, the geological location of the target user may indicate that the target user is in a supermarket. In this example, if the first information is to prompt the user to purchase some eggs, a notification command needs to be executed instantly, such that the target user remembers to purchase eggs during this shopping.

As such, based on the geological location, the user status of the target user may be acquired. In some embodiments, the user status may be acquired based on the geological location and the content of the first information.

In a fourth-type application scenario, the distance between the target user and the electronic device is considered. If the target user is relatively far from the electronic device, it is indicated that the user does not intend to check the electronic device, which means it is inconvenient for the user to check the first information. If the distance between the target user and the electronic device is smaller than or equal to a preset value, it is indicated that the target user tends to check the electronic device, which means it is convenient for the user to check the first information.

In some embodiments, the electronic device may include a proximity sensor, and the proximity sensor can be used to detect the distance from the electronic device to the user. In some other embodiments, the electronic device may include a camera, and the camera can be used to detect a distance from the camera to the user. In some other embodiments, the user may wear a location sensor, and the location sensor may detect a distance from the electronic device to the locating device.

As such, acquiring the user status configured to indicate whether it is convenient for the target user to check the first information may include: acquiring the user status based on second information configured to indicate a schedule of the target user, and/or third information configured to indicate a physiological condition of the target user, and/or fourth information configured to indicate a geological location of the target user, and/or fifth information configured to indicate a distance from the target user to the electronic device.

Further, if the schedule of the target user indicated by the second information is not a schedule for handling an important event, and/or if the physical condition of the target user indicated by the third information suggests that it is suitable for the target user to check the first information, and/or if the geological location of the target user indicated by the fourth information suggests that it is suitable for the target user to check the first information, and/or if the distance from the target user to the electronic device indicated by the fifth information is smaller than or equal to the preset value, the user status indicates that it is convenient for the target user to check the first information.

At S102, if the user status indicates that it is inconvenient for the target user to check the first information, execution of the notification command configured to prompt the user of acquisition of the first information is postponed.

Postponed execution of the notification command configured to prompt the user of acquisition of the first information may be implemented by configuring the electronic device to intercept the notification command and postpone the execution of the notification command. In some other embodiments, postponed execution of the notification command configured to prompt the user of acquisition of the first information may be implemented by using the electronic device to receive a message for postponed execution of the notification command configured to prompt the user of acquisition of the first information sent by the network apparatus, and configuring the electronic device to postpone the execution of the notification command based on the message.

At S103, if the user status indicates that it is convenient for the target user to check the first information, the notification command is executed.

After the electronic device receives the first information, directed towards the first information, there can be two situations. In one situation, execution of the notification command is postponed, i.e., S102 in FIG. 1 and described above. In the other situation, the notification command is executed instantly, i.e., S103 in FIG. 1 and described above.

As such, the present disclosure provides an information notification method in which after the electronic device acquires the first information, based on the user status configured to indicate whether it is convenient for the target user to check the first information, whether the execution of the notification command configured to prompt the target user of acquisition of the first information needs to be postponed is determined. If the user status indicates that it is inconvenient for the target user to check the first information, the execution of the notification command configured to prompt the target user of acquisition of the first information is postponed. If the user status indicates that it is convenient for the target user to check the first information, the notification command is executed instantly.

By using the disclosed method, the notification to the target user is configured to be delivered by the electronic device at a moment when it is convenient for the target user to check the first information. Thus, it is ensured that the target user will not miss the first information. Further, because the notification by the electronic device to the target user is delivered at a moment when it is convenient for the target user to check the first information, e.g., the target user is not notified when in a sleep condition or at a meeting, it is ensured that the target user will not be disturbed. Accordingly, the user experience is improved.

In some embodiments, if the first information is very important, even if it is inconvenient for the target user to check the first information at a current moment, the notification command is executed instantly. For example, the electronic device or the network apparatus may recognize the type of the user that send the first information to the target user, and if the type of the user is a user type configured to detect natural disasters, such as weather bureau and seismological bureau, the electronic device may be forced to execute the notification command instantly.

In another example, the electronic device or the network apparatus may recognize the content of the first information, and if the first information includes content such as earthquake alert or typhoon alert that represents a natural disaster, the electronic device may be forced to execute the notification command instantly.

In another example, the electronic device or the network apparatus may recognize the number of times that the same user sends the first information to the target user, and if the number of sending times is greater than or equal to a preset value, it is indicated that the user has an emergency event to notify the target user. Correspondingly, the electronic device is forced to execute the notification command instantly.

As such, the disclosed information notification method may further include: based on the number of times that the target user receives the first information from the same source user, and/or whether the first information includes a term configured to indicate an emergency event, and/or the type of the source user that sends the first information, determining whether the execution of the notification command configured to prompt the target user to receive the first information needs to be forced.

In one embodiment, if the user status indicates that it is inconvenient for the target user to check the first information, the execution of the notification command configured to prompt the target user of acquisition of the first information may be postponed, and after the execution of the notification command is postponed, the method may further include: periodically acquiring the user status that is configured to indicate whether it is convenient for the target user to check the first information, and when the user status indicates that it is convenient for the target user to check the first information, instantly executing the notification command.

Further, periodically acquiring the user status that is configured to indicate whether it is convenient for the target user to check the first information may be implemented by the electronic device or the network apparatus. If it is implemented by the network apparatus, the network apparatus may, after it is detected that the user status indicates that it is convenient for the target user to check the first information, send a message for instantly executing the notification command to the electronic device. After the electronic device receives the message, the intercepted notification command may be released, such that the electronic device may instantly execute the notification command. If it is executed by the electronic device, after the electronic device detects that the user status indicates it is convenient for the target user to check the first information, the intercepted notification command may be released instantly, such that the electronic device may execute the notification command instantly.

As such, the information notification method applicable to the electronic device may encounter two situations after the first information is received. In the first situation, if the user status indicates that it is inconvenient for the target user to check the first information, the execution of the notification command configured to prompt the user of acquisition of the first information may be postponed. In the second situation, if the user status indicates that it is convenient for the target user to check the first information, the notification command may be executed instantly.

Further, if the first situation occurs, the user status configured to indicate whether it is convenient for the target user to check the first information may be acquired periodically, and when the user status indicates that it is convenient for the target user to check the first information, the notification command is instantly executed.

As such, the disclosed information notification method may include two implementations. In the first implementation, after the electronic device generates the first information itself or receives the first information sent by the network apparatus, the notification command may be intercepted, and the electronic device may itself determine whether to postpone execution of the notification command or execute the notification command instantly.

In the second implementation, after the electronic device generates the first information or receives the first information sent by the network apparatus, the network apparatus acquires a determination result of postponing to execute the notification command or a determination result of executing the notification command instantly. Further, the network apparatus sends the determination result of postponing to execute the notification command or the determination result of executing the notification command instantly to the electronic device. The electronic device may, based on the determination result of postponing to execute the notification command or a determination result of executing the notification command, execute a corresponding operation.

Figure 2:
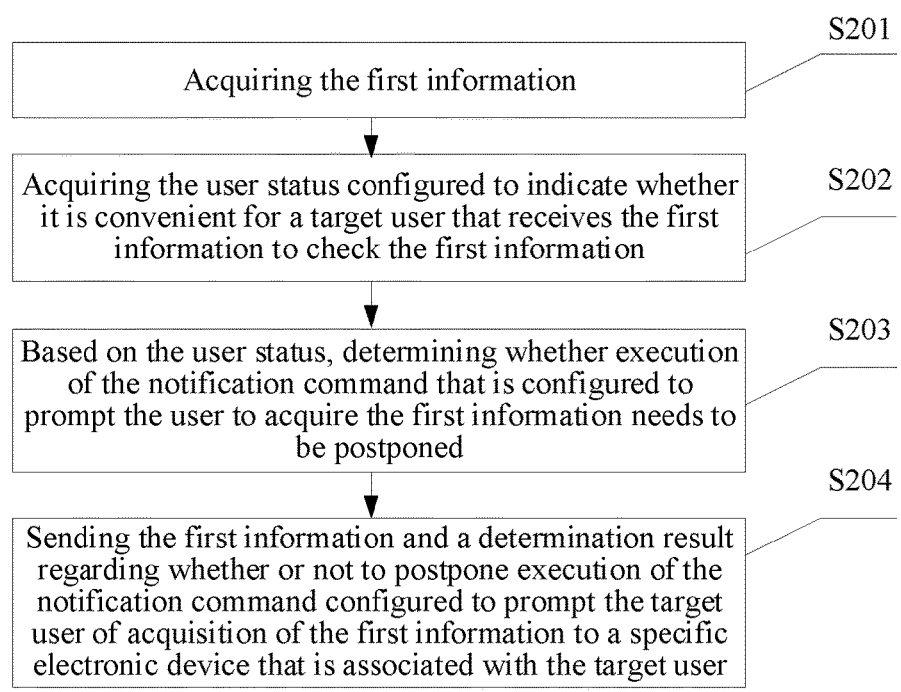
FIG. 2 illustrates a flow chart of an example of an information notification method applicable to a network apparatus.

The second implementation is introduced hereinafter in details. FIG. 2 illustrates a flow chart of an example of an information notification method applicable to a network apparatus. The method may include the followings.

At S201, the first information is acquired.

The network apparatus may function as a transit device. For example, if user 1 wishes to send the first information to user 2, user 1 may need to first send the first information to the network apparatus, and the network apparatus may send the first information to user 2.

The network apparatus may function as an application server. For example, the network apparatus may be an application server corresponding to the video application program. If a video in the video application program is updated or the version of the video application program needs to be updated, the server may send the first information that is configured to indicate that the video is updated or the version of the video application program needs to be updated to the electronic device in which the video application program is installed.

At S202, the user status configured to indicate whether it is convenient for a target user that receives the first information to check the first information is acquired.

In a first-type application scenario, the target user may be at a meeting, or may be communicating with an important client. Under this application scenario, the target user may prefer not to be disturbed. If the electronic device delivers notification under this application scenario, the target user may be disturbed, and the user experience may be lowered. Based on the schedule of the target user, the user status of the target user indicating whether the target user is currently at a meeting or is currently communicating with an important user may be acquired.

In a second-type application scenario, the physiological condition of the target user is considered. The physiological condition of the target user may include: a physical condition, and/or a schedule condition.

The physical condition may include: a health condition, and/or an emotion condition. For example, the health condition of the user may be acquired based on the health report of the target user and/or medical report such as X-ray report that are uploaded to the network apparatus by a health examination application program.

For example, the health condition of the target user may indicate that the target user has heart disease. In this example, if the target user is not focusing on the electronic device, sudden ringing or vibration of the electronic device to prompt notification may trigger the heart disease of the user.

The emotion condition of the target user may be recognized from the heart rate of the target user detected by a smart bracelet worn by the target user, and/or facial expression, and/or voice of the target user.

For example, the emotion condition of the target user may indicate that the target user is relatively happy. In this example, if the electronic device of the target user receives payment information of his credit card for a transaction authorized by his girlfriend without prior notice to the target user, the target user may not become angry finding his credit card to be unexpectedly charged because he is relatively happy. That is, the emotion condition of being happy may indicate that it is a good time or it is convenient for the user to check the first information, while the emotion condition of being unhappy may indicate that it is inconvenient for the user to check the first information.

The schedule condition may include whether the target user is in a sleep condition or an awake condition. In some embodiments, the target user may wear a smart bracelet, and based on the smart bracelet, the schedule condition of the target user may be acquired. If the user status indicates that the target user is in the sleep condition, it is indicated that it is inconvenient for the target user to receive the first information.

In a third-type application scenario, the geological location of the target user may indicate that the surrounding environment of the target user is relatively noisy, such that it is inconvenient for the target user to check the first information.

For example, the geological location of the target user may indicate that the target user is in a public place such as a Karaok (KTV) room. In this example, the target user will probably not notice any notification from the electronic device because the environment is relatively noisy. Under such situation, it is inconvenient for the user to check the first information.

As another example, the geological location of the target user may indicate that the target user is in a supermarket. In this example, if the first information is to prompt the user to purchase some eggs, a notification command needs to be executed instantly, such that the target user remembers to purchase eggs during this shopping.

As such, based on the geological location, the user status of the target user may be acquired. In some embodiments, the user status may be acquired based on the geological location and the content of the first information.

In a fourth-type application scenario, the distance between the target user and the electronic device is considered. If the target user is relatively far from the electronic device, it is indicated that the user does not intend to check the electronic device, which means it is inconvenient for the user to check the first information. If the distance between the target user and the electronic device is smaller than or equal to a preset value, it is indicated that the target user tends to check the electronic device, which means it is convenient for the user to check the first information.

In some embodiments, the electronic device may include a proximity sensor, and the proximity sensor can be used to detect the distance from the electronic device to the user. In some other embodiments, the electronic device may include a camera, and the camera can be used to detect a distance from the camera to the user. In some other embodiments, the user may wear a location sensor, and the location sensor may detect a distance from the electronic device to the locating device.

As such, acquiring the user status configured to indicate whether it is convenient for the target user to check the first information may include: acquiring the user status based on second information configured to indicate a schedule of the target user, and/or third information configured to indicate a physiological condition of the target user, and/or fourth information configured to indicate a geological location of the target user, and/or fifth information configured to indicate a distance from the target user to the electronic device.

Further, if the schedule of the target user indicated by the second information is not a schedule for handling an important event, and/or if the physical condition of the target user indicated by the third information suggests that it is suitable for the target user to check the first information, and/or if the geological location of the target user indicated by the fourth information suggests that it is suitable for the target user to check the first information, and/or if the distance from the target user to the electronic device indicated by the fifth information is smaller than or equal to the preset value, the user status indicates that it is convenient for the target user to check the first information.

At S203, based on the user status, whether execution of the notification command that is configured to prompt the user of acquisition of the first information needs to be postponed is determined.

In some embodiments, S203 may include: if the user status indicates that it is inconvenient for the target user to check the first information, it is determined that execution of the notification command configured to prompt the user of acquisition of the first information shall be postponed; and if the user status indicates that it is convenient for the target user to check the first information, it is determined that the notification command shall be executed instantly.

At S204, the first information and a determination result regarding whether to postpone execution of the notification command configured to prompt the target user of acquisition of the first information are sent to the electronic device that is associated with the target user.

The electronic device may be a device owned by the target user, such as a personal cellphone of the target user. The electronic device may also be a device having an association relationship with the target user, for example, the electronic device may be a smart audio system, a smart TV, or a smart fridge that is shared by members of the family to which the target user belongs. Further, the electronic device may be a smart projector shared by staff of a company for which the target user works.

After the network apparatus acquires the first information, the approaches for the network apparatus to determine the target user for receiving the first information may include but not limited to the followings, and illustrations are provided hereinafter with reference to specific application scenarios.

In the first application scenario, the first information is sent by a first user to the network apparatus. If the first user expects to send the first information to the target user via the network apparatus, the first information often needs to carry an identity of the target user, such as a cellphone number, an international mobile subscriber identity (IMSI), a wechat ID, or a QQ number. Based on the identity of the target user, the target user may be determined.

In the second application scenario, the first information is sent by a smart device to the network apparatus. If the smart device in the smart home needs to send the first information to the family members, the first information may be sent to the network apparatus (e.g., a smart router in the home network, or a smart central control device in the home network). The smart router or the smart central control device may acquire the family members in the home network to which the smart device belongs. All family members may be regarded as the target users.

For example, if a first video in the smart TV is updated, the first information configured to indicate that the first video is updated may be sent to each of the family members. In another example, if the food stored in the smart fridge is insufficient, e.g., the number of eggs is too low, the smart fridge may send the first information configured to indicate a need to purchase eggs to the smart router or the smart central control device. The smart router or the smart central control device may send the first information to all family members.

In some embodiments, not all family members watch the smart TV, for example, sometimes the mother of a family is assumed to watch the smart TV. Similarly, not all family members purchase the eggs, for example, the wife of a family is usually assumed to purchase the eggs. Thus, the smart router or the smart central control device may select the target user for executing an operation event indicated by the first information from at least one user (e.g., family member) that is eligible to receive the first information.

Directed towards the smart TV, the operation event indicated by the first information refers to watching the updated first video, and in this situation, the mother is the target user. For the smart fridge, the operation event indicated by the first information refers to purchase of the eggs, and correspondingly, the wife is the target user.

That is, in these embodiments, not all family members receive the first information. For example, other than the wife, none of the family members such as the father, the older sister, or the younger sister purchases eggs. Thus, if the first information configured to indicate a need to purchase eggs is sent to the father, the older sister, or the younger sister, the first information configured to indicate the purchase of eggs is meaningless for them because they never purchase eggs.

In other words, when the operation event indicated by the first information refers to watching the updated first video, one of the family members—the mother—may be selected as the target user for executing the operation event. Similarly, when the operation event indicated by the first information refers to purchase of eggs, one of the family members—the wife—may be selected as the target user for executing the operation event.

Further, if it is inconvenient for the target user such as the mother or the wife to check the first information, the execution of the notification command may be postponed, and when it becomes convenient for the target user to check the first information, the target user may be then timely notified about the first information. In one embodiment, the user status configured to indicate whether it is convenient for the target user to check the first information may be acquired periodically, and when the user status indicates that it is convenient for the target user to check the first information, the determination result indicating the notification command needs to be executed instantly may be sent to the electronic device.

In some embodiments, the approach of recognizing the target user for executing the operation event indicated by the first information from at least one user that is eligible to receive the first information may include: based on one or more historical operation events corresponding users to each of the at least one user, selecting the target user having a historical operation event that matches the operation event indicated by the first information from the at least one user.

The one or more historical operation events may include: a historical payment operation event, and/or a historical purchase record, and/or historical operation information configured to indicate operation events executable by the electronic device.

The historical payment operation event may include: a record of a payment operation implemented by utilizing an application program. Because the payment operation implemented by utilizing the application program may include a transaction object and the transaction object may be a XX supermarket or a XX restaurant, spots where a user usually purchase merchandize may be determined based on the transaction object. For example, if a user often spends money at supermarkets, the user may be selected as the target user to purchase eggs.

The historical purchase record may include: a record of types of products purchased using an application program. For example, types of products purchased using the application program may include commodity, audio system, or food that are usually purchased by the user through the application program.

The historical operation information may include: the operation information of the user that utilizes a first electronic device to control a second electronic device that is under control of the first electronic device. For example, the historical operation information may include the operation information of the user that uses a smart phone to control a smart audio system to broadcast music, or the operation information of the user that uses the smart phone to control a smart TV to play videos.

In the third application scenario, the network apparatus may be an application network apparatus. In this scenario, a user whose electronic device is installed with an application program corresponding to the application network apparatus may be recognized as the target user.

After the target user is determined based on the aforementioned embodiments, i.e., the object that needs to be monitored is determined, Acquiring the user status (S202) may be executed. In some other embodiments, after the target user is determined, acquiring the user status that is configured to indicate whether it is convenient for the target user to check the first information may be periodically executed, based on the determination result regarding postponed execution of the notification command configured to prompt the target user of acquisition of the first information. Further, when the user status indicates that it is convenient for the target user to check the first information, sending the determination result that indicates the notification command needs to be executed instantly to the electronic device is executed.

After the target user needs to be monitored is determined, if the first information and the determination result need to be sent to the target user, the first information and the determination result may be sent to the electronic device associated with the target user.

The number of the electronic devices associated with the target user may be one, or more than one. If there is only one electronic device associated with the target user, the first information and the determination result may be sent to the electronic device directly.

If there is more than one electronic device associated with the target user, the first information and the determination result may be sent to all electronic devices. However, such configuration may cause the target user to check the first information repeatedly, which reduces the user experience.

Thus, in some embodiments, from the electronic devices associated with the target user, a specific electronic device belonging to the target user may be acquired, and the first information and the determination result regarding whether to postpone execution of the notification command configured to prompt the target user of acquisition of the first information may be sent to the specific electronic device. In some embodiments, the specific electronic device may refer to the electronic device, such as a cellphone or a notebook, that belongs only to the target user.

In some other embodiments, one or more electronic devices each having a distance to the target user shorter than or equal to a preset value may be selected from the electronic devices associated with the target user. Further, the first information and the determination result regarding whether to postpone execution of the notification command configured to prompt the target user of acquisition of the first information may be sent to the selected one or more electronic devices.

If the determination result is to postpone the execution of the notification command configured to prompt the target user of acquisition of the first information, the user status configured to indicate whether it is convenient for the target user to check the first information may be acquired periodically. When the user status indicates that it is convenient for the target user to check the first information, the determination result of instantly executing the notification command may be sent to the electronic device.

For example, the target user may use the smart camera to shoot some photos, and the target user may fall asleep once back home. During the sleep of the target user, the smart camera may successfully copy the photos to a memory center of the family, such as a cloud network attached storage (cloud NAS), and the memory center may further complete classification and organization of the photos, or even complete the process of facial beauty for all or certain photos.

At a given moment, if the target user is still sleeping, the network apparatus may send the information indicating that photo processing is completed and a determination result to postpone the execution of the notification command to the smart phone that has a distance to the target user shorter than or equal to the preset value. In one embodiment, because the closer the smart phone is to the target user, the more convenient it is for the target user to check the first information, the network apparatus may send the information indicating that photo processing is completed and a determination result to postpone the execution of the notification command to the smart phone that has a minimal distance to the target user.

To prompt the target user that the processing of the photos is completed when it is convenient for the target user to check the first information (i.e., the information that photo processing is completed), the user status of the target user may be periodically acquired. Thus, if the target user becomes awake, the network apparatus may send the determination result of instantly executing the notification command to the smart phone, and the smart phone may instantly execute the notification command, such that the target user is timely notified that the processing of the photos is completed.

In some other embodiments, an electronic device that matches the first information may be selected from the electronic devices associated with the target user. The determination result regarding whether to postpone execution of the notification command configured to prompt the target user of acquisition of the first information may be sent to the selected electronic device.

In another example, the target user may utilize the smart phone to shoot some photos, and the target user may fall asleep once back home. During the sleep of the target user, the smart phone may successfully copy the photos to the memory center of the family, such as a cloud NAS, and the memory center may further fulfill classification and organization of the photos, or even complete the process of facial beauty for the photos.

At this moment, if the target user is still sleeping, because the display screen of the computer is relatively large, which is more appropriate for the target user to check the photos than the smart phone, the information indicating that the photo processing is completed and the determination result to postpone the execution of the notification command may be sent to the computer.

Further, to notify the target user that the processing of the photos is completed when it is convenient for the target user to check the first information (i.e., the information indicating that photo processing is completed), the user status of the target user may be periodically acquired. Once the target user becomes awake, the network apparatus may send the determination result of instantly executing the notification command to the computer, and the computer may instantly execute the notification command, such that the target user is timely notified that the processing of the photos is completed.

In some other embodiments, an electronic device that has a distance to the target user shorter than or equal to a preset value may be selected from the electronic devices associated with the target user, and the first information and the determination result regarding whether to postpone execution of the notification command configured to prompt the target user of acquisition of the first information may be sent to the selected electronic device.

In another example, the target user may utilize the smart phone to shoot some photos, and the target user may fall asleep once back home. During the sleep of the target user, the smart phone may successfully copy the photos to the memory center of the family, such as a cloud NAS, and the memory center may fulfill classification and organization of the photos, or even complete the process of facial beauty for the photos.

If at this moment, the target user is still sleeping, the network apparatus may not instantly ask the electronic device to prompt the target user that the photo processing is completed. Once the target user wakes up and further sits in front of a computer to browse some latest news, the network apparatus may determine that the distance from the target user to the computer is minimal, and that the display screen of the computer may be most suitable for the user to check the photos took by the target user. Under this situation, the network apparatus may notify the target user that the processing of the photos is completed through a display screen of the computer, or in manners of voice or vibration.

Figure 3:
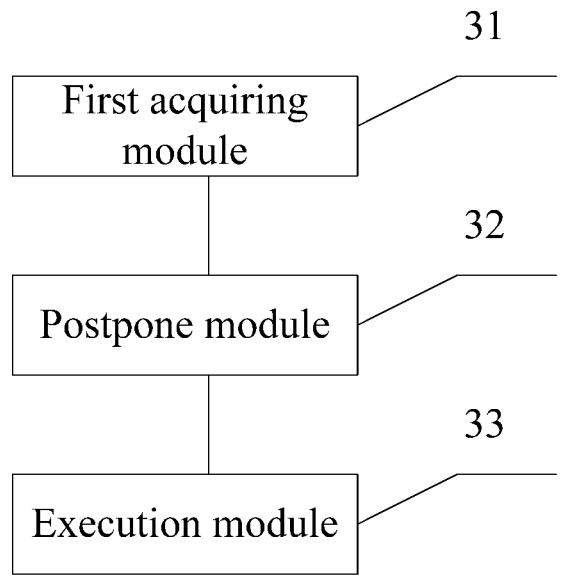
FIG. 3 illustrates a structural view of an example of an electronic device.

FIG. 3 illustrates a structural view of an example of an electronic device. The electronic device includes a first acquiring module 31, a postpone module 32, and an execution module 33. The first acquiring module 31 may be configured to acquire first information and acquire a user status that is configured to indicate whether it is convenient for the target user to check the first information. The postpone module 32 may be configured to, if the user status indicates that it is inconvenient for the target user to check the first information, postpone execution of the notification command configured to prompt the user of acquisition of the first information. The execution module 33 may be configured to, if the user status indicates that it is convenient for the target user to check the first information, execute the notification command.

In some embodiments, the electronic device may further include a second acquiring module. The second acquiring module may be configured to, if the user status indicates that it is inconvenient for the target user to check the first information, periodically acquire the user status that is configured to indicate whether it is convenient for the target user to check the first information. When the user status indicates that it is convenient for the target user to check the first information, the second acquiring module may be configured to instantly execute the notification command.

In some embodiments, the first acquiring module may be specifically configured to acquire the user status, based on second information configured to indicate a schedule of the target user, and/or third information configured to indicate a physiological condition of the target user, and/or fourth information configured to indicate a geological location of the target user, and/or fifth information configured to indicate a distance from the target user to the electronic device.

Further, if the schedule of the target user indicated by the second information is not a schedule for handling an important event, and/or if the physical condition of the target user indicated by the third information suggests that it is suitable for the target user to check the first information, and/or if the geological location of the target user indicated by the fourth information suggests that it is suitable for the target user to check the first information, and/or the distance from the target user to the electronic device indicated by the fifth information is smaller than or equal to the preset value, the user status indicates that it is convenient for the target user to check the first information.

Figure 4:
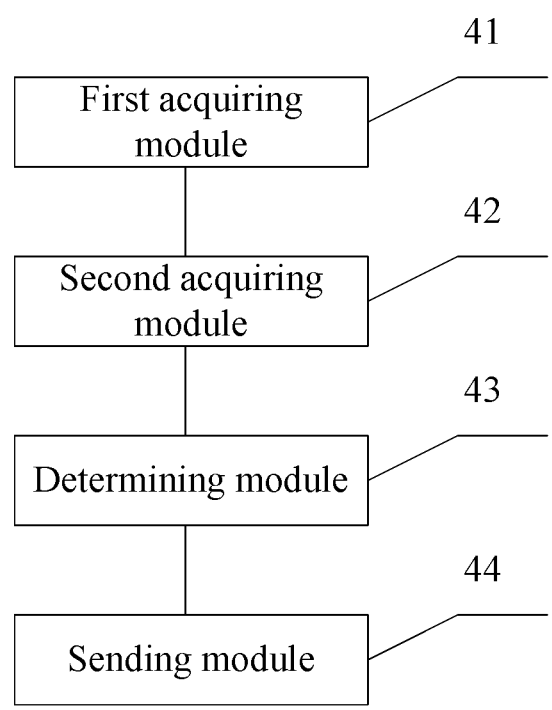
FIG. 4 illustrates a structural view of an example of a network apparatus.

FIG. 4 illustrates a structural view of an example of a network apparatus. The network apparatus includes a first acquiring module 41, a second acquiring module 42, a determining module 43, and a sending module 44. The first acquiring module 41 may be configured to acquire first information. The second acquiring module 42 may be configured to acquire a user status configured to indicate whether it is convenient for the target user that receives the first information to check the first information. The determining module 43 may be configured to, based on the user status, determine whether to postpone execution of a notification command configured to prompt the target user of acquisition of the first information. The sending module 44 may be configured to send the first information and the determination result regarding whether to postpone the execution of the notification command configured to prompt the target user of acquisition of the first information to the electronic device associated with the target user.

In some embodiments, the network apparatus may further include a third acquiring module. The third acquiring module may be configured to, based on the determination result to postpone the execution of the notification command configured to prompt the target user of acquisition of the first information, periodically acquire the user status that is configured to indicate whether it is convenient for the target user to check the first information. When the user status indicates that it is convenient for the target user to check the first information, the third acquiring module may send the determination result of instantly executing the notification command to the electronic device.

In some embodiments, the second acquiring module 42 may include a first selecting unit and a first acquiring unit.

The first selecting unit may be configured to select a target user from at least one user that is eligible to receive the first information for executing an operation event indicated by the first information. The first acquiring unit is configured to acquire the user status configured to indicate whether it is convenient for the target user to check the first information.

In some embodiments, the first selecting unit may include a selecting sub-unit. The selecting sub-unit may be configured to, based on one or more historical operation events corresponding to each of the at least one user, selecting the target user having a historical operation event that matches the operation event indicated by the first information from the at least one user.

In some embodiments, the sending module 44 may include a second acquiring unit and a first sending unit. The second acquiring unit may be configured to, from the electronic devices associated with the target user, acquire a specific electronic device belonging to the target user. The first sending unit may be configured to send the first information and the determination result regarding whether to postpone the execution of the notification command configured to prompt the target user of acquisition of the first information to the specific electronic device.

In some other embodiments, the sending module 44 may include a second selecting unit and a second sending unit. The second selecting unit may be configured to select one or more electronic devices each having a distance to the target user shorter than or equal to a preset value from the electronic devices associated with the target user. The second sending unit is configured to send the first information and the determination result regarding whether to postpone the execution of the notification command configured to prompt the target user of acquisition of the first information to the selected one or more electronic devices.

Figure 5:
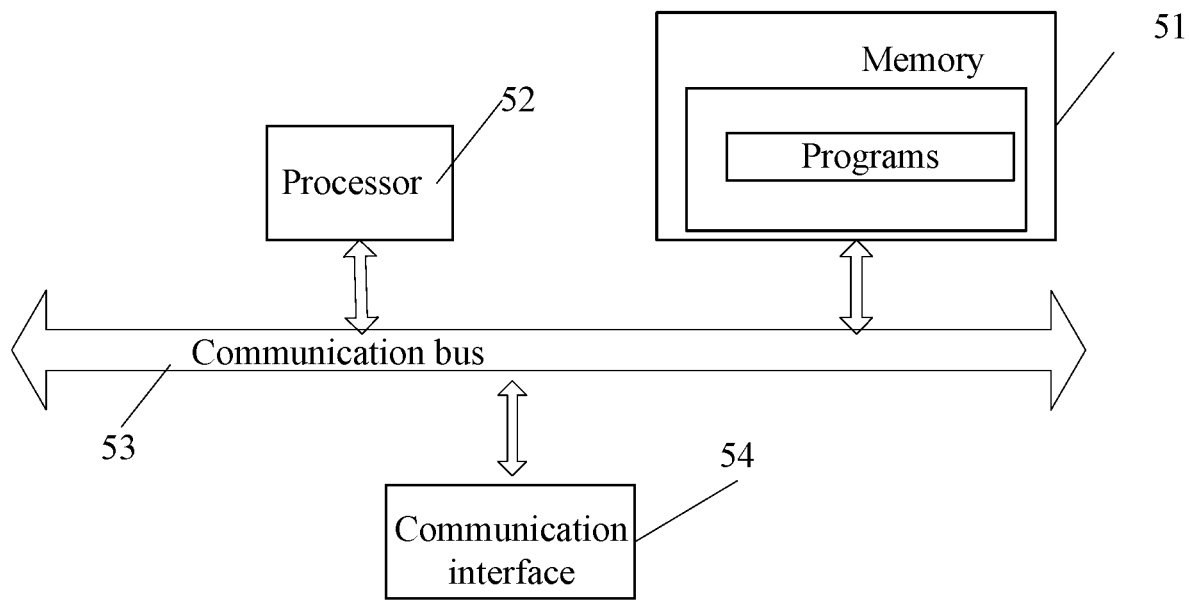
FIG. 5 illustrates a structural view of another example of an electronic device.

FIG. 5 illustrates a structural view of another example of an electronic device. As shown in FIG. 5, the electronic device includes a memory 51 and a processor 52. The memory 51 may be configured to store one or more programs, and the processor 52 may be configured to execute the one or more programs to: acquire first information and acquire a user status configured to indicate whether it is convenient for the target user to check the first information. If the user status indicates that it is inconvenient for the target user to check the first information, the processor 52 may postpone execution of the notification command configured to prompt the user of acquisition of the first information. Further, if the user status indicates that it is convenient for the target user to check the first information, the processor 52 may execute the notification command instantly.

The memory 51 may include, for example, a high-speed random access memory (RAM), or may include a non-volatile memory, such as at least one magnetic disk storage. The processor 52 may include, for example, a central processing unit (CPU), or an application specific integrated circuit (ASIC). The processor 52 may also be configured as one or more integrated circuits.

In some embodiments, as shown in FIG. 5, the electronic device further includes a communication bus 53 and a communication interface 54. The memory 51, the processor 52, and the communication interface 54 may realize mutual communication through the communication bus 53. In some embodiments, the communication interface 54 may be an interface of a communication module, such as the interface of a Global System for Mobile Communications (GSM) module.

In some embodiments, the processor 52 may be further configured to, if the user status indicates that it is inconvenient for the target user to check the first information, periodically acquire the user status that is configured to indicate whether it is convenient for the target user to check the first information. When the user status indicates that it is convenient for the target user to check the first information, the processor 52 may be configured to instantly execute the notification command.

In some embodiments, when acquiring the user status configured to indicate whether it is convenient for the target user to check the first information, the processor 52 may specifically: acquires the user status based on second information configured to indicate a schedule of the target user, and/or third information configured to indicate a physiological condition of the target user, and/or fourth information configured to indicate a geological location of the target user, and/or fifth information configured to indicate a distance from the target user to the electronic device.

Further, if the schedule of the target user indicated by the second information is not a schedule for handling an important event, and/or if the physical condition of the target user indicated by the third information suggests that it is suitable for the target user to check the first information, and/or if the geological location of the target user indicated by the fourth information suggests that it is suitable for the target user to check the first information, and/or the distance from the target user to the electronic device indicated by the fifth information is smaller than or equal to the preset value, the user status indicates that it is convenient for the target user to check the first information.

Figure 6:
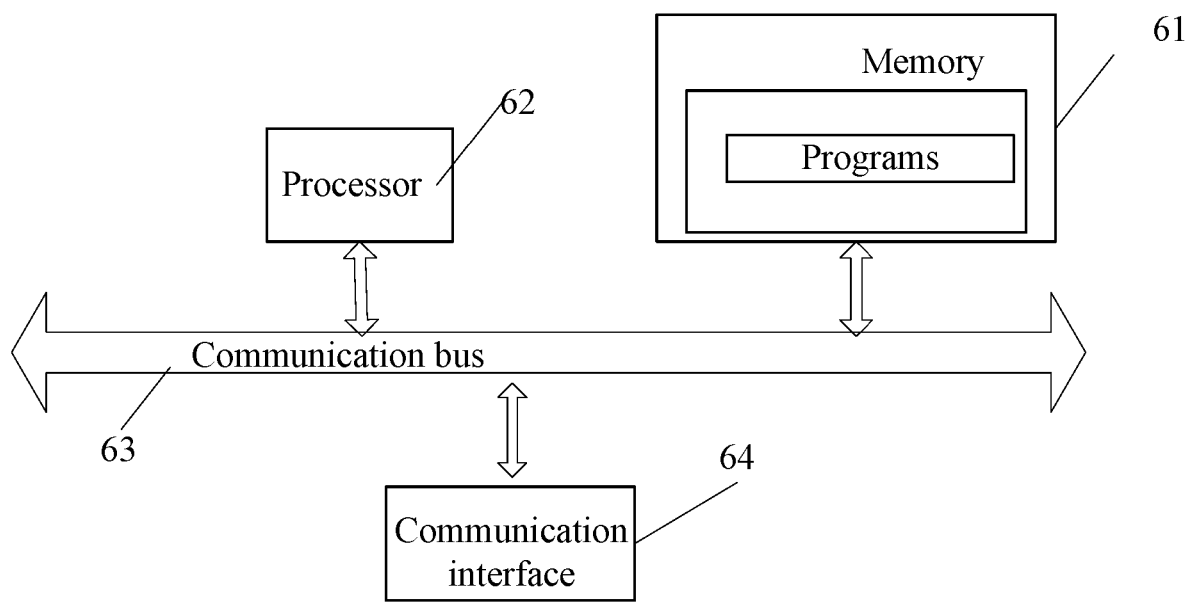
FIG. 6 illustrates a structural view of another example of a network apparatus.

FIG. 6 illustrates a structural view of another example of a network apparatus. As shown in FIG. 6, the network apparatus includes a memory 61 and a processor 62. The memory 61 may be configured to store one or more programs. The processor 62 may be configured to execute the one or more programs to: acquire first information, and acquire a user status configured to indicate whether it is convenient for the target user that receives the first information to check the first information. The processor 62 may further execute the one or more programs to, based on the user status, determine whether to postpone execution of a notification command that is configured to prompt the target user of acquisition of the first information, and send the first information and the determination result regarding whether to postpone the execution of the notification command configured to prompt the target user of acquisition of the first information to the electronic device associated with the target user.

The memory 61 may include, for example, a high-speed RAM memory, or may further include a non-volatile memory, such as at least one magnetic disk storage. The processor 62 may include, for example, a CPU, or an application specific integrated circuit (ASIC). The processor 62 may also be configured as one or more integrated circuits.

In some embodiments, as shown in FIG. 6, the electronic device further includes a communication bus 63 and a communication interface 64. The memory 61, the processor 62, and the communication interface 64 may realize mutual communication through the communication bus 63. In some embodiments, the communication interface 64 may be an interface of a communication module, such as the interface of a GSM module.

In some embodiments, the processor 62 may be further configured to, based on a determination result to postpone the execution of a notification command configured to prompt the target user of acquisition of the first information, periodically acquire the user status that is configured to indicate whether it is convenient for the target user to check the first information. When the user status indicates that it is convenient for the target user to check the first information, the processor 62 may send the determination result to instantly execute the notification command to the electronic device.

In some embodiments, when acquiring the user status that is configured to indicate whether it is convenient for the target user to check the first information, the processor 62 is specifically configured to: select a target user from at least one user that is eligible to receive the first information for executing an operation event indicated by the first information; and acquire the user status configured to indicate whether it is convenient for the target user to check the first information.

Optionally, when selecting a target user from the at least one user that is eligible to receive the first information to execute an operation event indicated by the first information, the processor 62 is specifically configured to, based on one or more historical operation events corresponding to each of the at least one user, selecting the target user having a historical operation event that matches the operation event indicated by the first information from the at least one user.

Optionally, when sending the first information and the determination result regarding whether to postpone execution of the notification command configured to prompt the target user of acquisition of the first information to the electronic device associated with the target user, the processor 62 may be configured to execute the following.

For example, the processor 62 may be configured to: from the electronic devices associated with the target user, acquire the specific electronic device belonging to the target user; and send the first information and the determination result regarding whether to postpone the execution of the notification command configured to prompt the target user of acquisition of the first information to the specific electronic device.

As another example, the processor 62 may be configured to: select one or more electronic devices that each have a distance to the target user shorter than or equal to a preset value from the electronic devices associated with the target user; and send the first information and the determination result regarding whether to postpone the execution of the notification command configured to prompt the target user of acquisition of the first information to the selected one or more electronic devices.

The present disclosure further provides a memory medium, in which one or more programs are stored, and when being executed by a processor, the one or more programs may realize the information notification method applicable to an electronic device.

The present disclosure further provides a memory medium, in which one or more programs are stored, and when being executed by a processor, the one or more programs may realize the information notification method applicable to a network apparatus.

In the present disclosure, relational terms such as first, second (or then) are merely for differentiating one object or operation from another object or operation without necessarily requiring or indicating any actual relationship or sequence between such objects or operations. Further, terms of "comprising" and "including" or any other variations thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In examples provided by the present disclosure, it should be understood that, the disclosed devices and methods may be implemented through other manners. Various embodiments in the specification are described in a progressive manner, and each embodiment may be highlighted by its difference from other embodiments, and different embodiments may be referred to each other for the same or similar parts.

The aforementioned illustrations of the disclosed embodiments teach those skilled in the relevant art to implement or employ the present disclosure. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising:
   acquiring, using a processor of an electronic device, first information;
   acquiring second information of a target user, including acquiring, from a location sensor worn by the target user, a distance of the target user to the electronic device;
   determining, by the processor, a user status of the target user according to the second information, the user status including whether the distance is smaller than a preset value;
   determining, by the processor, a number of times the target user receives the first information from a same sender;
   determining, by the processor, to present a notification to the target user in response to the distance being smaller than the preset value or the number of times the target user receives the first information from a same sender exceeding a threshold number;
   determining, by the processor, not to present a notification to the target user in response to the distance not being smaller than the preset value and the number of times the target user receives the first information from a same sender not exceeding the threshold number;
   in response to the processor determining not to present the notification to the target user, postponing, by the processor, execution of a notification command that prompts the target user of acquisition of the first information; and
   in response to the processor determining to present the notification to the target user, executing, by the processor, the notification command.

2. The method according to claim 1, further comprising:
   in response to the processor determining not to present the notification to the target user, periodically acquiring the second information and determining the user status; and
   in response to the processor determining to present the notification to the target user, instantly executing the notification command.

3. The method according to claim 1, wherein:
   acquiring the second information further includes one or more of: acquiring a schedule of the target user, acquiring a physiological condition of the target user, and acquiring a geological location of the target user, and the user status further includes: whether the schedule indicates that the target user is handling an important event, whether the physical condition of the target user indicates that it is suitable for the target user to check the first information, and whether the geological location of the target user indicates that it is suitable for the target user to check the first information.

4. A method comprising:

acquiring, using a processor, first information;

acquiring second information of a target user, including acquiring a distance of the target user to a specific electronic device associated with the target user, the distance being obtained from a location sensor worn by the target user;

determining, by the processor, a user status of a target user according to the second information, the user status including whether the distance is smaller than a preset value;

determining, by the processor, a number of times the target user receives the first information from a same sender;

in response to the distance being smaller than the preset value or the number of times the target user receives the first information from the same sender exceeding a threshold number, determining, by the processor, execution of a notification command that prompts the user of acquisition of the information needs not to be postponed;

in response to the distance not being smaller than the preset value and the number of times the target user receives the first information from the same sender not exceeding the threshold number, determining, by the processor, execution of a notification command that prompts the user of acquisition of the information needs to be postponed; and sending, by the processor, the information and a determination result regarding whether to postpone the execution of the notification command to the specific electronic device associated with the target user.

5. The method according to claim 4, further comprising:

in response to the determination result indicating to postpone the execution of the notification command, periodically acquiring the second information and determining the user status; and in response to the user status indicating it is convenient for the target user to check the information, sending a determination result of instantly executing the notification command to the electronic device.

6. The method according to claim 4, further comprising:

selecting the target user from a plurality of users that are eligible to receive the information for executing an operation event indicated by the information.

7. The method according to claim 6, wherein selecting the target user from the plurality of users includes:

based on a historical operation event corresponding to each of the at least one user, selecting one of the at least one user having a historical operation event that matches the operation event indicated by the information as the target user.

8. The method according to claim 4, further comprising, before sending the information and the determination result to the electronic device:

selecting one of electronic devices associated with the target user that belongs to the target user as the specific electronic device.

9. An electronic device comprising:

a memory, wherein the memory stores a program; and a processor, wherein the processor executes the program to:

acquire first information;

acquire second information of a target user of the electronic device, including acquiring a distance of a target user to the electronic device from a location sensor worn by the target user;

determine a user status of a target user according to the second information, the user status including whether the distance is smaller than a preset value;

determine a number of times the target user receives the first information from a same sender;

determine to present a notification to the target user in response to the distance being smaller than the preset value or the number of times the target user receives the first information from a same sender exceeding a threshold number;

determine not to present a notification to the target user in response to the distance not being smaller than the preset value and the number of times the target user receives the first information from the same sender not exceeding the threshold number;

in response to determining not to present the notification to the target user, postpone execution of a notification command that prompts the target user of acquisition of the information; and in response to determining to present the notification to the target user, execute the notification command.

10. The electronic device according to claim 9, wherein the processor further executes the program to:

in response to determining not to present the notification to the target user, periodically acquire the second information and determine the user status; and in response to determining to present the notification to the target user, instantly execute the notification command.

11. The electronic device according to claim 9, wherein:

the processor further executes the program to:

acquire a schedule of the target user, acquire a physiological condition of the target user, and acquire a geological location of the target user, and the user status further includes: whether the schedule indicates that the target user is handling an important event, whether the physical condition of the target user indicates that it is suitable for the target user to check the first information, and whether the geological location of the target user indicates that it is suitable for the target user to check the first information.

12. A network apparatus comprising:

a memory, wherein the memory stores a program; and a processor, wherein the processor executes the program to:

acquire first information;

acquire second information of a target user, including acquiring a distance of the target user to a specific electronic device, the distance being obtained from a location sensor worn by the target user;

determine a user status of a target user according to the second information;

determine a number of times the target user receives the first information from a same sender;

in response to the distance being smaller than the preset value or the number of times the target user receives the first information from the same sender exceeding a threshold number, determine that execution of a notification command that prompts the user of acquisition of the information not to be postponed;

in response to the distance not being smaller than the preset value or the number of times the target user receives the first information from the same sender not exceeding the threshold number, determine that execution of a notification command that prompts the user of acquisition of the information to be postponed; and send the information and a determination result regarding whether to postpone the execution of the notification command to the specific electronic device associated with the target user.

13. The apparatus according to claim 12, wherein the processor further executes the program to:

in response to the determination result indicating to postpone the execution of the notification command, periodically acquire the second information and determine the user status; and in response to the user status indicating it is convenient for the target user, send a determination result of instantly executing the notification command to the specific electronic device.

14. The apparatus according to claim 12, wherein the processor further executes the program to:

select the target user from a plurality of users eligible to receive the information for executing an operation event indicated by the information.

15. The apparatus according to claim 14, wherein the processor further executes the program to:

based on a historical operation event corresponding to each of the plurality of users, select one of the plurality of users having a historical operation event that matches the operation event indicated by the information as the target user.

16. The apparatus according to claim 12, wherein the processor further executes the program to, before sending the information and the determination result to the electronic device:

select one of electronic devices associated with the target user that belongs to the target user as the specific electronic device.

\* \* \* \* \*